(12) United States Patent  
Maloney et al.

(10) Patent No.: US 7,207,285 B2  
(45) Date of Patent: Apr. 24, 2007

(54) VARIABLE HYBRID CATAMARAN AIR CUSHION SHIP

(75) Inventors: Kenneth J. Maloney, New Orleans, LA (US); Charles S. Whipple, Jr., Slidell, LA (US)

(73) Assignee: Textron Innovations Inc., Providence, RI (US)

(*) Notice: Subject to any disclaimer, the term of this patent is extended or adjusted under 35 U.S.C. 154(b) by 0 days.

(21) Appl. No.: 11/050,633

(22) Filed: Feb. 3, 2005

(65) Prior Publication Data

US 2005/0211150 A1 Sep. 29, 2005

Related U.S. Application Data

(63) Continuation-in-part of application No. 10/661,113, filed on Sep. 12, 2003, and a continuation-in-part of application No. PCT/US03/28848, filed on Sep. 12, 2003.

(51) Int. Cl.
 *B63B 1/32* (2006.01)
 *B63B 1/38* (2006.01)
(52) U.S. Cl. .................................... 114/288; 114/67 A

(58) Field of Classification Search ............. 114/67 A, 114/288, 289, 126
See application file for complete search history.

(56) References Cited

U.S. PATENT DOCUMENTS

| 3,141,436 | A | * | 7/1964 | Cathers et al. | ............... | 180/120 |
| 3,458,007 | A | * | 7/1969 | Todd | ........................... | 180/128 |
| 5,651,327 | A | * | 7/1997 | Whitener | .................... | 114/271 |
| 7,013,826 | B2 | * | 3/2006 | Maloney et al. | ............. | 114/288 |

* cited by examiner

*Primary Examiner*—Jesús D. Sotelo
(74) *Attorney, Agent, or Firm*—Garvey, Smith, Nehrbass & North, L.L.C.; Seth M. Nehrbass; Charles C. Garvey, Jr.

(57) ABSTRACT

A vessel (10) designed to operate efficiently as both a catamaran and air cushion vessel can travel at low speed (e.g. Froude number (Fn)=0–0.3) in a catamaran or displacement mode and at high speed (e.g. Froude numbers (Fn)=0.3 or more) in an air cushion or dynamically supported mode. The vessel (10) includes molded catamaran hulls (11, 12) with parabolic waterlines, a flexible, air cushion seal system (16, 17), surface piercing propellers (20) and a propulsion system (e.g. combined diesel and gas turbine). There are preferably auxiliary gas turbines for generating lift air pressure. Forward mounted independently stabilizing foils (30), can optionally facilitate ride stabilization and load compensation at high and low speeds. The foils also generate transverse roll forces to improve high speed maneuvering.

23 Claims, 6 Drawing Sheets

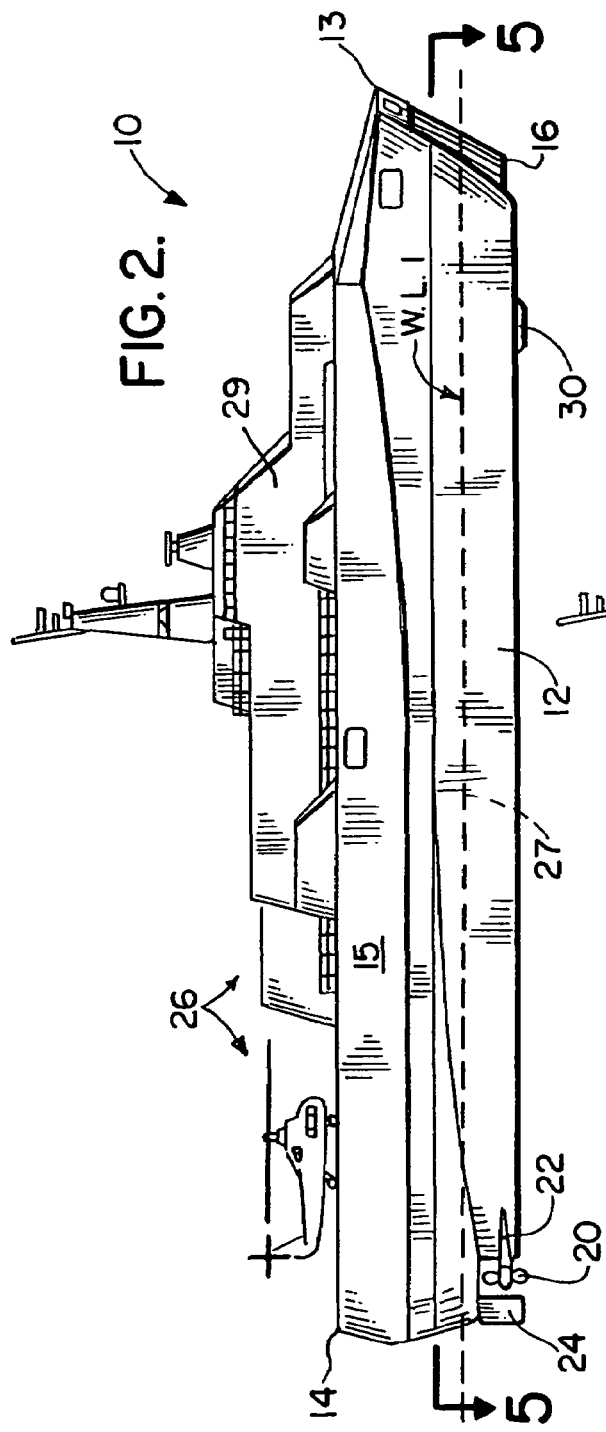
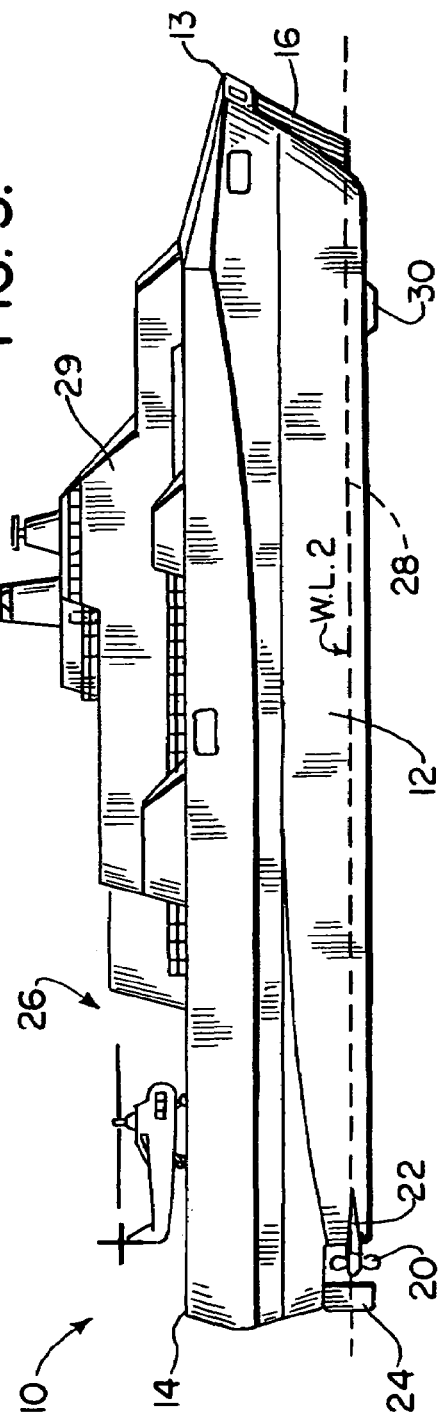

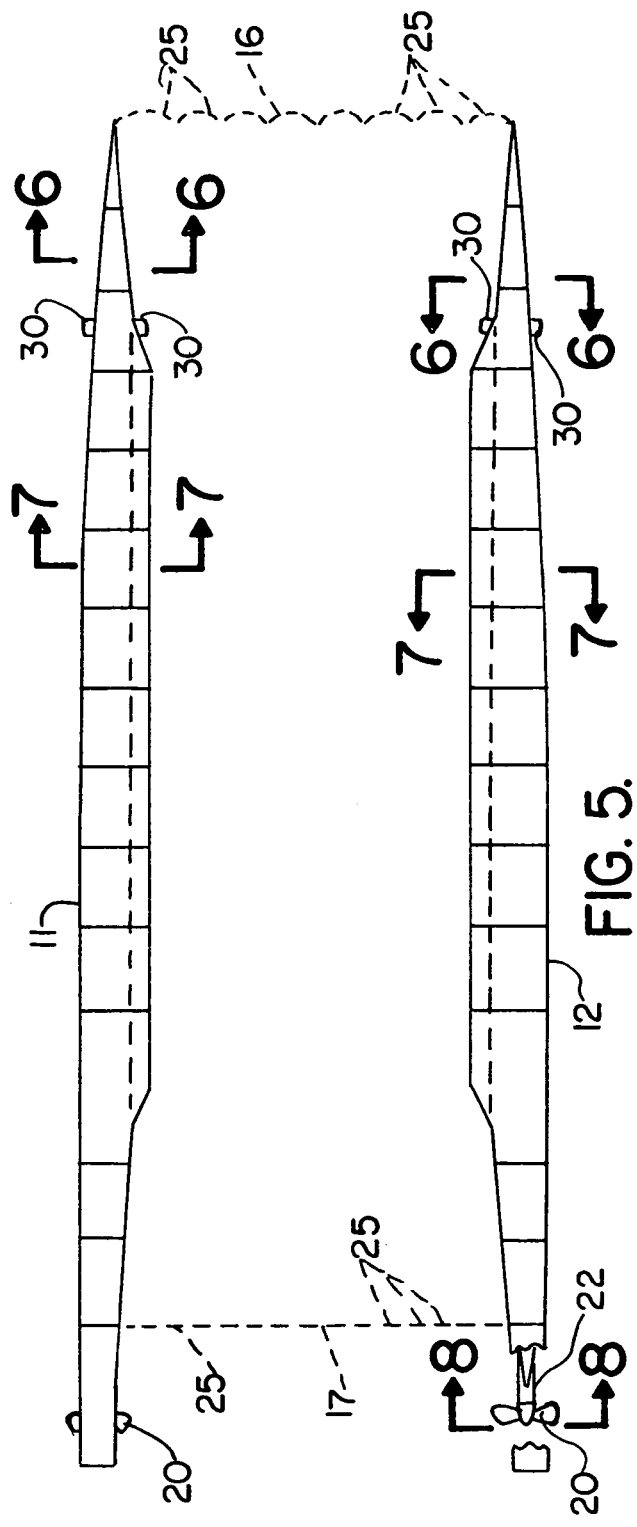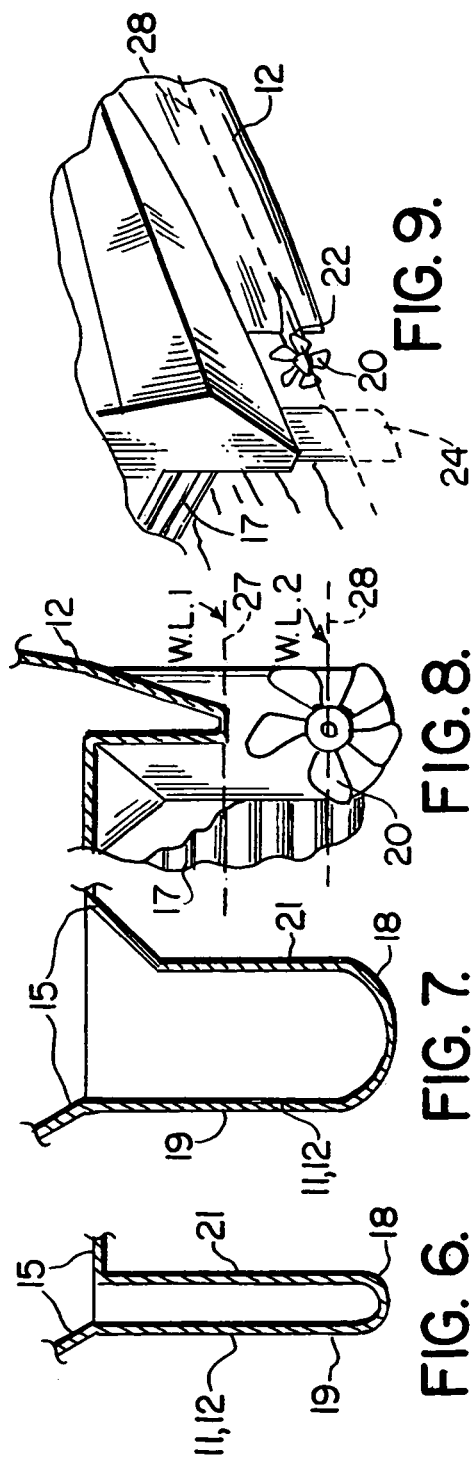

VARIABLE HYBRID CATAMARAN AIR CUSHION SHIP

CROSS-REFERENCE TO RELATED APPLICATIONS

Incorporated herein by reference are U.S. patent application Ser. No. 10/661,113, filed 12 Sep. 2003, published as publication no. US2004112268 on 17 Jun. 2004 and International Application No. PCT/US03/28848, filed 12 Sep. 2003, published as publication no. WO2004024552 on 25 Mar. 2004, and those publications. This is a continuation-in-part of both of these prior patent applications.

STATEMENT REGARDING FEDERALLY SPONSORED RESEARCH OR DEVELOPMENT

Not applicable

REFERENCE TO A MICROFICHE APPENDIX

Not applicable

BACKGROUND OF THE INVENTION

1. Field of the Invention

The present invention relates to catamaran air cushion ships. More particularly, the present invention relates to an improved surface effect ship or air cushion ship with a catamaran hull that enables low, high and intermediate speeds with improved efficiency.

2. General Background of the Invention

The typical side hull geometry that has been employed by surface effect ships is a prismatic, hard-chine planing hull. These types of hulls are inefficient at developing lift and have very high wave making drag characteristics when the ship is off cushion in the displacement mode. Their primary advantages come from their ease of production and their tendency to introduce a degree of dynamic stability at high speeds. In some situations, an intermediate speed that is in between a low displacement mode and a high speed air cushion mode is desirable.

In general, catamaran air cushion ships, also known as surface effect ships, are known. Examples disclosed in U.S. Patents are listed in the following table. The following table also lists some propeller related art.

TABLE 1

| U.S. Pat. No. | Title | Issue Date |
| --- | --- | --- |
| 1,976,046 | Waterfoil | Oct. 9, 1934 |
| 2,405,115 | Floating Structure | Aug. 6, 1946 |
| 3,065,723 | Supercavitating Hydrofoils | Nov. 27, 1962 |
| 3,077,173 | Base Ventilated Hydrofoil | Feb. 12, 1963 |
| 3,141,436 | Hydrofoil Assisted Air Cushion Boat | Jul. 21, 1964 |
| 3,458,007 | Captured Air Bubble (CAB) Ground Effect Machine | Jul. 29, 1969 |
| 3,621,932 | Gas-Cushion Vehicles | Nov. 23, 1971 |
| 3,917,022 | Twin Cushion Surface Effect Vehicle | Nov. 4, 1975 |
| 3,987,865 | Gas-Cushion Vehicle Skirt | Oct. 26, 1976 |
| 4,469,334 | Sealing System For The Air Cushion Of An Air-Cushion Vessel | Sep. 4, 1984 |
| 4,489,667 | Surface Effect Ship Seals | Dec. 25, 1984 |
| 4,506,618 | Propeller And Keel Arrangement For Surface Effect Ships | Mar. 26, 1985 |
| 4,535,712 | Variable Air Cushion Mode Vehicle | Aug. 20, 1985 |
| 4,543,901 | Surface Effect Ship Air Cushion Seal System | Oct. 1, 1985 |
| 4,646,866 | Surface Effect Type, Side Keel Vessel Fitted With An Improved Forward Buoyancy Cushion Seal Apparatus | Mar. 3, 1987 |
| 4,660,492 | Catamaran Air Cushion Water Vehicle | Apr. 28, 1987 |
| 4,708,077 | Hull Shapes For Surface Effect Ship With Side Walls And Two Modes Of Operation | Nov. 24, 1987 |
| 4,714,041 | Structure of surface effect ship with side walls | Dec. 22, 1987 |
| 4,739,719 | Movable bow seal air ride boat hull | Apr. 26, 1988 |
| 4,767,367 | Integrated Combination Propeller Drive Shaft Fairing and Water Intake Sea Chest Arrangement, For High Speed Operating Marine Craft | Aug. 30, 1988 |
| 5,651,327 | Displacement, Submerged Displacement, Air Cushion Hydrofoil Ferry Boat | Jul. 29, 1997 |
| 5,711,494 | Aero-Hydroglider | Jan. 27, 1998 |
| 5,934,215 | Stabilized Air Cushioned Marine Vehicle | Aug. 10, 1999 |
| 6,293,216 | Surface Effect Ship (SES) Hull Configuration Having Improved High Speed Performance and Handling Characteristics | Sep. 25, 2001 |
| 6,439,148 | Low-Drag, High-Speed Ship | Aug. 27, 2002 |
| 6,526,903 | High speed M-shaped boat hull | Mar. 04, 2003 |
| 6,609,472 | Stable efficient air lubricated ship | Aug. 26, 2003 |
| 2003/0000440 | Air Assisted Landing Craft | Jan. 02, 2003 |

Incorporated herein by reference are U.S. Pat. Nos. 4,767,367; 6,293,216; and 6,439,148. These three patents relate generally to surface effect ships or hovercraft.

Also incorporated by reference is the following:

JOHN LEWTHWAITE, "The PACSCAT Concept and its application to Fast Landing Craft", presented at MACC Multi Agency Craft Conference 2002, The Pulse of Technology, 18–20 Jun. 2002, Naval Amphibious Base Little Creek, Norfolk (19 pages)

BRIEF SUMMARY OF THE INVENTION

The present invention comprises a vessel designed to operate as both a catamaran and an air cushion vessel. This hybrid catamaran air cushion ship has several advantages over previous air cushion and surface effect ship designs. It will be able to efficiently travel at low speeds (Froude number (Fn)=about 0–0.4) in the catamaran or displacement mode. It will also have the ability to operate efficiently in the air cushion or dynamically supported mode at high speeds (Froude number (Fn)=about 0.4 and greater) and with the ability to operate at all speeds. Any number of intermediate dynamic support modes can be achieved by throttling the lift fan system that supplies pressurized air to the air cushion.

It will be able to efficiently travel at low speeds (e.g. about 0–20 knots (0–37 km/hour)) in the catamaran or displacement mode. It will also have the ability to operate in the air cushion or dynamically supported mode at high speeds (e.g. about 50 knots (93 km/hour) and greater) and with the ability to operate at all speeds. The air cushion can also be used to reduce the ship's already shallow static draft from, for example, approximately five meters to less than one meter. This ability decreases underwater signatures and has been proven in several full-scale tests to improve survivability in the event of a mine encounter.

This design concept departs from previous surface effect ships in one key area. With very few exceptions, the surface effect vessels built to date have been designed to optimize high speed performance. The vessel of the present invention will operate efficiently at high speeds, but will also be able to operate efficiently in the lower speed regime.

This multi-mode operation capability will enable the marine vessel of the present invention to adapt to sea conditions and operate for extended periods without refueling.

The marine vessel of the present invention features molded catamaran hulls with parabolic waterlines, a flexible, air cushion seal system, an independently powered lift fan (air cushion) system, surface piercing propellers (optionally controllable pitch) and a power plant for each propeller (e.g. combined diesel and gas turbine propulsion system).

Lift air pressure can be generated, for example, by auxiliary gas turbines or diesels. Intermediate operating modes that are in between displacement mode and air high speed air cushion mode can be achieved by varying power to the lift fan system. Forward mounted lifting foils may be used to facilitate ride stabilization and load compensation, at high and low speeds. These foils may also be used to generate transverse roll forces to improve high speed maneuvering.

The vessel of the present invention can displace e.g. up to 2,400 long tons, but is scalable and may be manifested in lesser or greater displacements. A vessel in this displacement range, can be, for example, approximately 90 m in length, with about a 30 m beam. Speeds cited earlier would be consistent with this size vessel.

The concept of the hybrid catamaran air cushion ship of the present invention combines an improved, specially configured catamaran design with equally viable concepts in air cushion vehicle technology. The side hulls of the present invention are designed to be as efficient as possible, by reducing wave making resistance. The marine vessel of the present invention provides superior performance via lower wave marking drag at all speeds. Total resistance is further reduced at high speeds, through reductions in wetted surface area resulting from the lift provided by the air cushion. To accomplish this task effectively, the present invention provides several features.

The side hulls of the present invention are preferably molded (rounded) forms featuring parabolic waterlines and semi-elliptical cross sections (see FIGS. 6–7). These forms minimize the characteristic wave trains associated with low speeds and have been shown to have superior drag characteristics at both low and high speeds.

The present invention may optionally employ small lifting surfaces to provide load compensation, ride control and high-speed stabilization. These surfaces can take the form of two, independently controlled, wing sections mounted port and starboard below the waterline on the side hulls (e.g., inboard and forward). Their primary task is to provide ride control at all speeds but they will also provide high-speed stability, enhancing both directional control and maneuvering.

A hybrid hullform was designed, using slender forms for the sidehulls rather than the long planing bodies used for most surface effect ships. The sidehull depth was set to provide a cross structure (wet deck) clearance (e.g. two meters) above the water, enabling operation as a catamaran, with some allowance for future weight growth.

The lift system and air cushion seals provide additional wet deck clearance (of, e.g., five meters) when on-cushion (when the vessel is operated in conjunction with a pressurized air cushion), resulting in a low keel draft (e.g., about one meter) in calm water conditions.

The marine vessel of the present invention can be operated with varying levels of air pressure, with the advantage of improving sea keeping. It is feasible to run in catamaran mode and then transition to the air cushion mode while underway at high speeds. This feature avoids high drag transition speeds of prior art surface effect ships.

The propulsor is preferably designed for high efficiency in a low speed mode and high speed mode as well as numerous intermediate modes. Propellers can be used as propulsors, propellers being preferred across the entire speed range. To be efficient at high speeds, a propeller preferably operates in the partially submerged mode to avoid prohibitively high drag from the hub and related support structure. Because of the change in keel immersion as the ship goes from off cushion to on cushion, a stern-mounted propeller can be arranged to naturally operate fully submerged in the catamaran mode and surface piercing in the surface effect ship mode.

BRIEF DESCRIPTION OF THE SEVERAL VIEWS OF THE DRAWINGS

For a further understanding of the nature, objects, and advantages of the present invention, reference should be had to the following detailed description, read in conjunction with the attached drawings which are identified as follows:

FIG. 2 is a side view of the preferred embodiment of the apparatus of the present invention showing the displacement mode;

FIG. 3 is a side view of the preferred embodiment of the apparatus of the present invention showing the high speed, planing mode;

FIG. 5 is a sectional view taken along the lines 5—5 of FIG. 2;

FIG. 6 is a sectional view taken along the lines 6—6 of FIG. 5;

FIG. 7 is a sectional view taken along the lines 7—7 of FIG. 5;

FIG. 8 is a sectional, end view taken along the lines 8—8 of FIG. 5;

FIG. 9 is a fragmentary perspective view of the preferred embodiment of the apparatus of the present invention illustrating the propulsion system for one of the hulls;

DETAILED DESCRIPTION OF THE INVENTION

Figure 1:
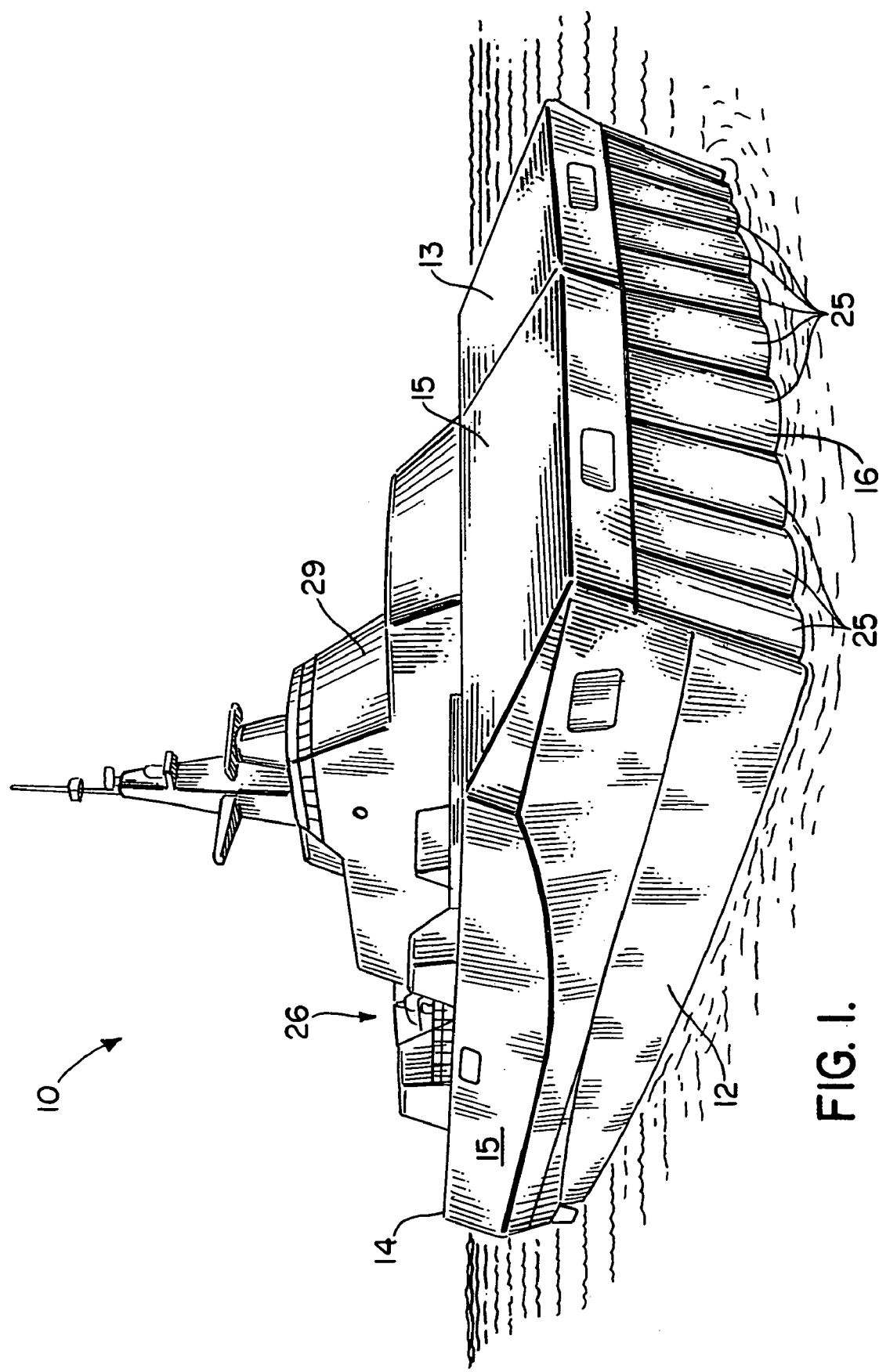
FIG. 1 is a perspective view of the preferred embodiment of the apparatus of the present invention.
Figure 4:
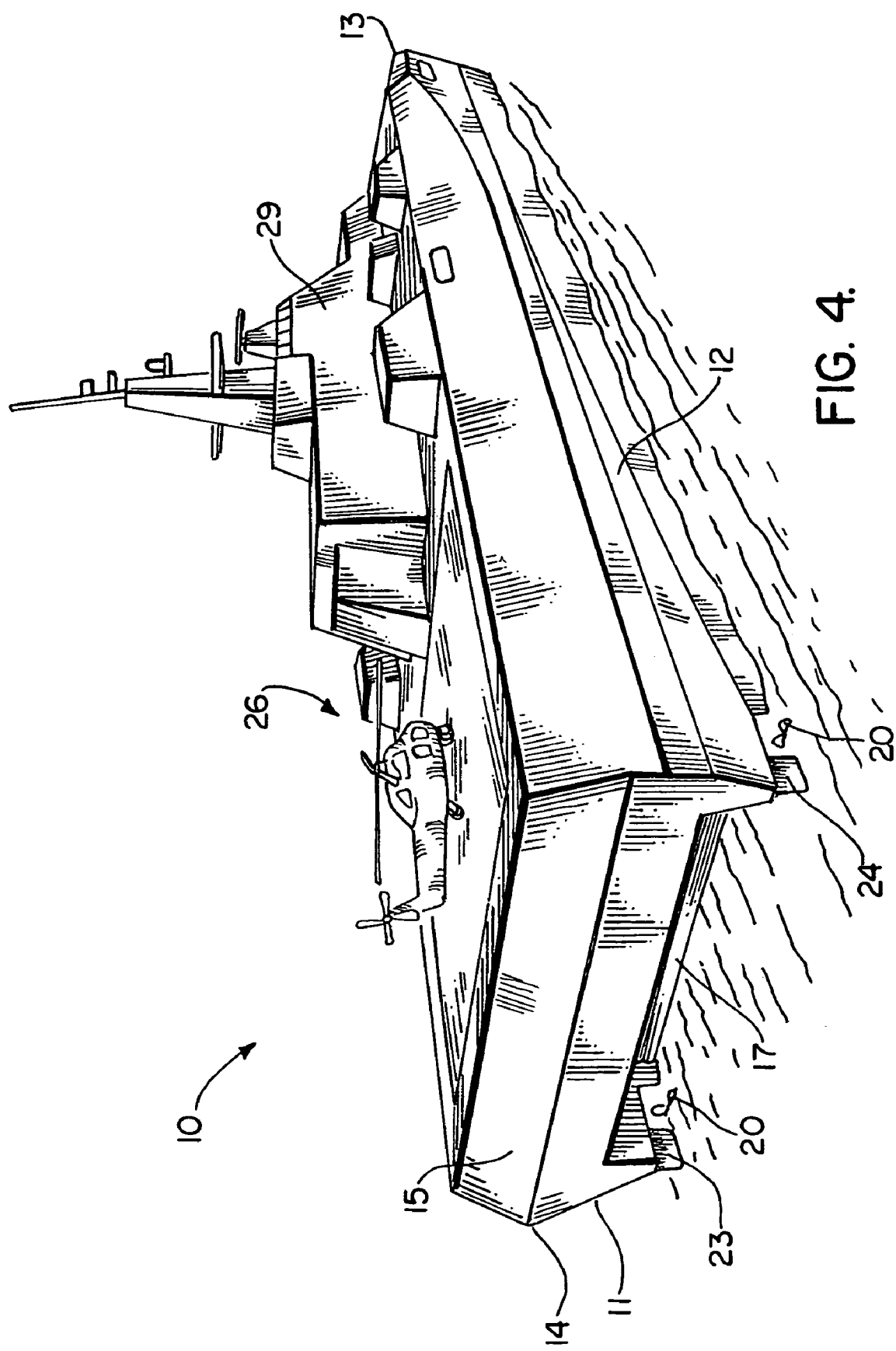
FIG. 4 is a rear perspective view of the preferred embodiment of the apparatus of the present invention showing the high speed, planing mode.

The marine vessel of the present invention is designed to operate as both a catamaran and air cushion vessel. The hybrid catamaran air cushion ship of the present invention is designated generally by the numeral 10 in FIGS. 1–4. Marine vessel 10 has several advantages over previous air cushion and surface effect ship designs. It will be able to efficiently meet the demands of the low speed (Froude number 0–0.4) requirements in the catamaran or displacement mode (see first water line, numeral 27 in FIG. 2). The vessel 10 of the present invention will also have the ability to operate in the air cushion or dynamically supported mode, (see second water line, numeral 28 in FIG. 3) where it will meet the high speed (Froude numbers 0.4 and higher) performance targets and provide the ability to operate in extreme sea states.

Figure 12:
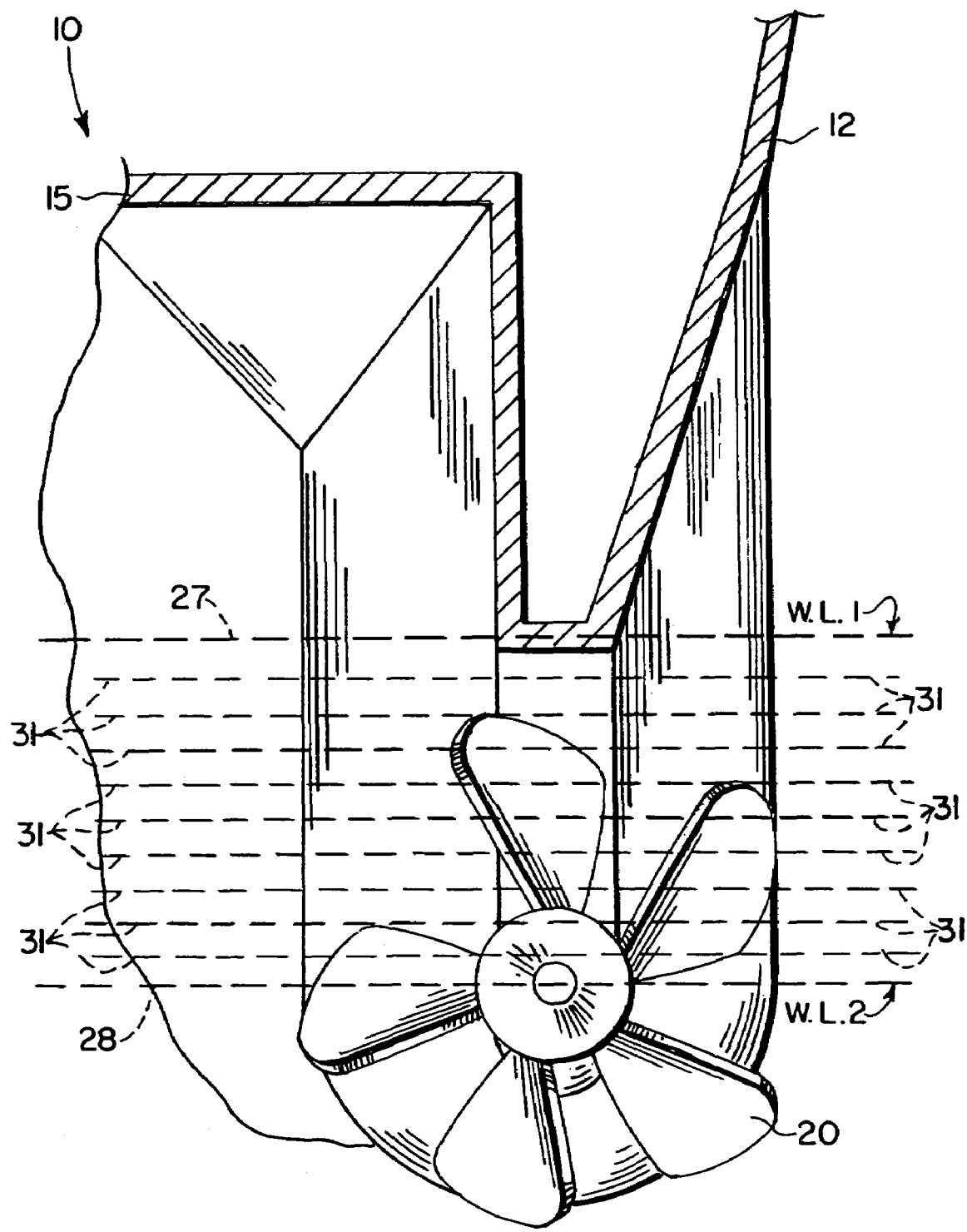
FIG. 12 illustrates multiple intermediate waterlines that can be achieved in intermediate modes that are in between the low speed displacement and high speed air cushion modes.

Vessel 10 will be able to efficiently meet the demands of the low speed (e.g. 0–20 knots (0–37 km/hour)) requirements in the catamaran or displacement mode (see first water line, numeral 27 in FIG. 2). The vessel 10 of the present invention will also have the ability to operate in the air cushion or dynamically supported mode, (see second water line, numeral 28 in FIG. 3) where it will meet the high speed (e.g. 50 knots (93 km/hour) or higher) performance targets and provide the ability to operate in extreme sea states. In FIG. 12, the numerals 31 show that several intermediate water lines can be achieved, each in between the first and second water lines 27, 28. Such an intermediate water line 31 can be selected for example in rough seas or when a reduced wake is desired.

The air cushion can be used to reduce the ship's static draft (from for example approximately five meters to for example less than one meter). This ability decreases underwater signatures and has been proven in several full-scale tests to improve survivability in the event of a mine encounter.

Hybrid catamaran air cushion ship 10 has a catamaran hull defined by port hull 11 and starboard hull 12. The vessel 10 provides a bow 13 and stern 14. Platform 15 is connected to and spans between the port hull 11 and starboard hull 12. The catamaran hull and platform 15 carry a powered lift fan system (e.g. gas turbine) for forming an air space between hulls 11, 12 and seals 16, 17. Such powered lift fan systems are known in the art. The horsepower to the lift fan system can be varied using a throttle for selecting any number of intermediate water lines 31 of FIG. 12.

Figure 10:
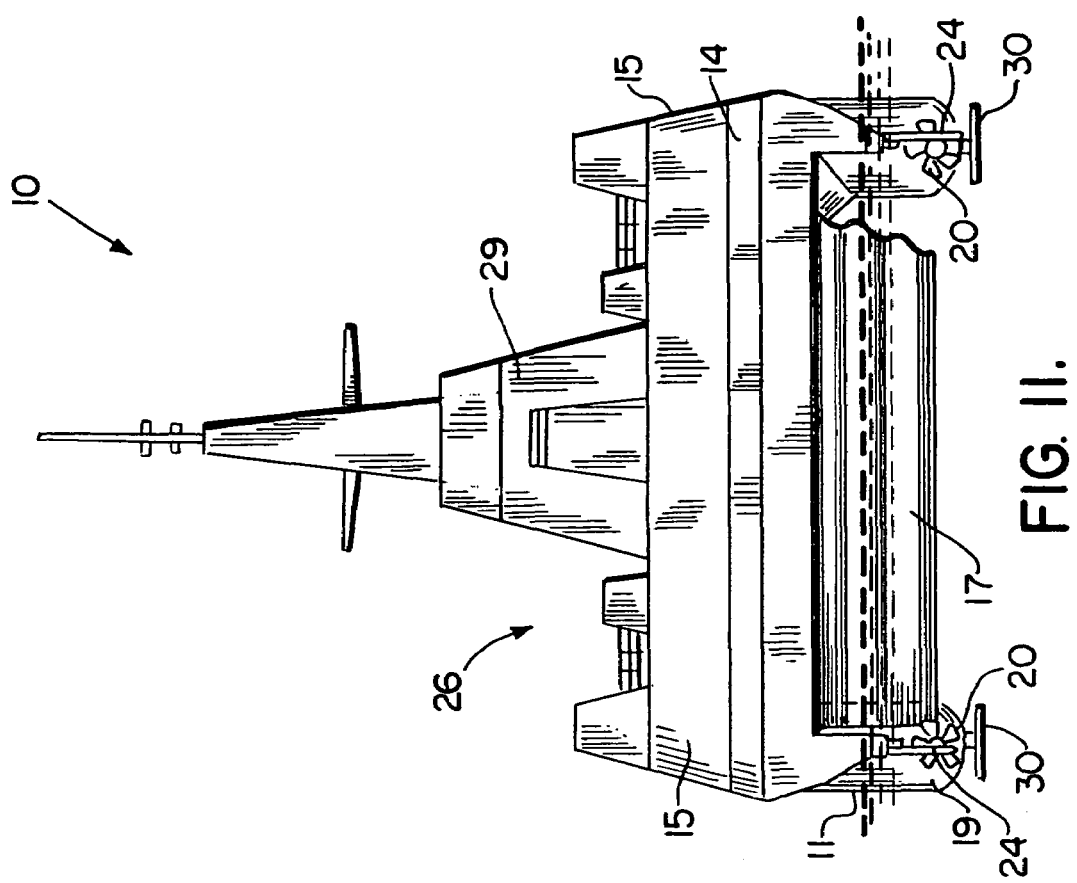
FIG. 10 is a front view of the preferred embodiment of the apparatus of the present invention showing the displacement mode.

Each hull 11, 12 can optionally be provided with hydrofoil stabilizers 30 (see, e.g., FIGS. 10 and 11), being very stable without hydrofoil stabilizers. At bow 13, forward seal 16 can be in the form of a plurality of individual finger seals 25. Such a seal 16 can be seen for example in prior U.S. Pat. Nos. 3,621,932; 3,987,865; and 4,646,866, each incorporated herein by reference. Forward seal 16 includes preferably a plurality of between about four and ten (preferably eight) fingers or elements 25. These can be optionally retracted when low speed operation (FIG. 2) is required. However, the retraction feature is optional because tests show that there is no measurable drag penalty with the seals 16, 17 dragging in the water during low speed operation. These fingers 25 can also be used to generate transverse roll forces to improve high speed maneuvering.

Figure 11:
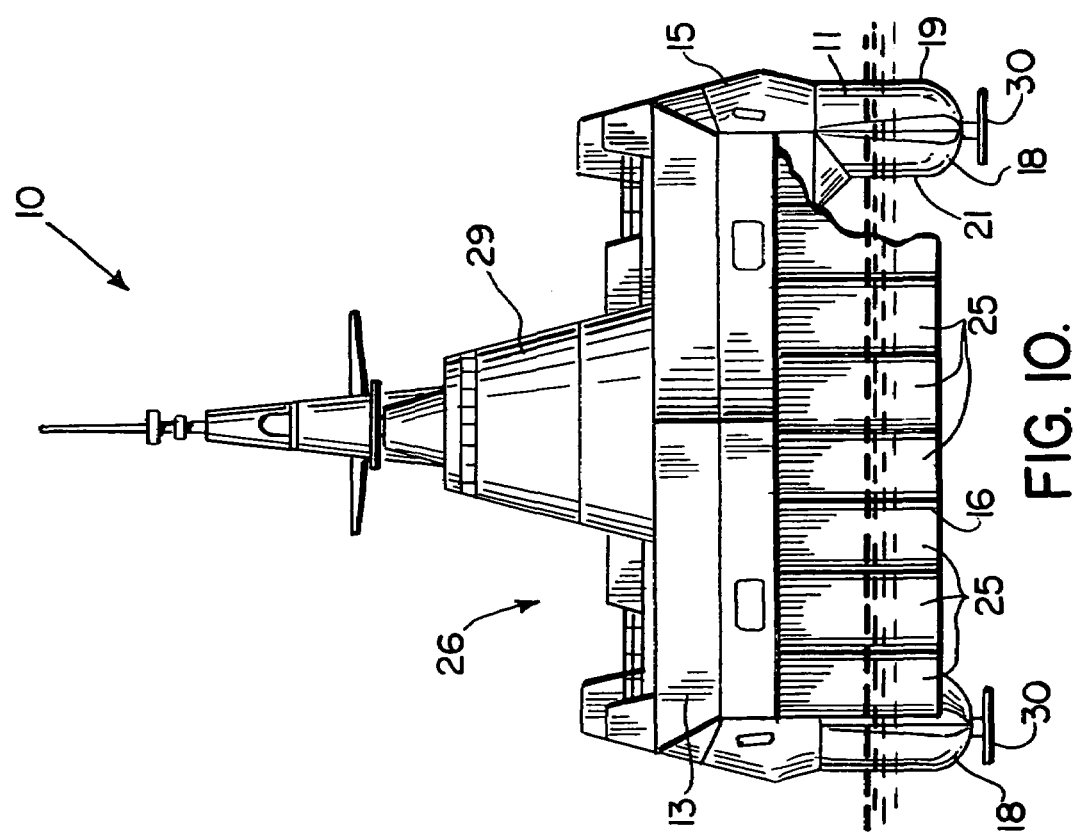
FIG. 11 is a rear view of the preferred embodiment of the apparatus of the present invention showing the displacement mode.

An aft seal 17 is provided at stern 14 as shown in FIG. 11. The forward and aft seals 16, 17 in combination with the catamaran hulls 11, 12 provide a space that can be pressurized with air for providing an air cushion that supports the ship 10 in a high speed mode shown in FIG. 3. In the mode of FIG. 3, the second water line 28 extends through the center of rotation of propellers 20, enabling the air cushion ship 10 of the present invention to attain high speeds of for example in excess of 50 knots (93 km/hour) with minimal resistance. Propellers 20 are designed to operate in a surface piercing mode and/or fully wetted mode (where the propellers 20 are typically fully submerged) and can for example be driven by a diesel or a gas turbine power plant or a combined diesel and gas turbine power plant.

In a slow travel mode of for example between about 0 and 20 knots (0 and 37 km/hour), vessel 10 can travel in a displacement mode that is shown in FIG. 2. That vessel 10 is in the displacement mode in FIG. 2 can be seen by observing first water line 27. In the displacement mode of FIG. 2, the propellers 20 are fully submerged as is each of the rudders 23, 24. In the displacement mode of FIG. 2, the forward and aft seals 16, 17 can be retracted or removed.

In FIGS. 5–9, each of the hulls 11, 12 is a smooth hull providing a smooth outer surface that does not have any hard chines. Such a hull construction as shown in FIGS. 5–9 is very efficient at low speeds. Each of the port hull 11 and starboard hull 12 has a smooth curved bottom 18 and a pair of opposed smooth side walls 19, 21. The side walls 19, 21 include outer side wall 19 and inner side wall 21. The side walls 19, 21 can be generally vertically oriented as shown in FIGS. 6 and 7. These hulls 11, 12 preferably have parabolic waterlines.

A propeller shaft housing 22 that is tubular in shape can extend from the rear of each of the port and starboard hulls 11, 12 as shown in FIGS. 2, 3, 8, and 9. Each hull 11, 12 has its own surface piercing propeller 20. Port hull 11 provides port rudder 23. Starboard hull 12 provides starboard rudder 24.

A deck area 26 can be provided that includes a super structure 29. This deck area 26 can provide a hangar, flight deck, and a plurality of hatches to enable numerous uses for the ship. It is able to operate efficiently at high speeds, but is also able to operate efficiently in the lower speed regime.

The hulls 11, 12 can be made of aluminum, steel, composite materials, or any other suitable material which will be apparent to those of ordinary skill in this art.

The following is a list of suitable parts and materials for the various elements of the preferred embodiment of the present invention.

PARTS LIST

| Parts Number | Description |
| --- | --- |
| 10 | hybrid catamaran air cushion ship |
| 11 | port hull |
| 12 | starboard hull |
| 13 | bow |
| 14 | stern |
| 15 | platform |
| 16 | forward seal |
| 17 | aft seal |
| 18 | curved bottom |
| 19 | outer side wall |
| 20 | propeller |
| 21 | inner side wall |
| 22 | propeller shaft housing |
| 23 | port rudder |
| 24 | starboard rudder |
| 25 | bow seal element |

-continued

| Parts Number | Description |
| --- | --- |
| 26 | deck area |
| 27 | first water line (displacement mode) |
| 28 | second water line (planing mode) |
| 29 | superstructure |
| 30 | foil stabilizer |
| 31 | intermediate water line |

All measurements disclosed herein are at standard temperature and pressure, at sea level on Earth, unless indicated otherwise.

The foregoing embodiments are presented by way of example only; the scope of the present invention is to be limited only by the following claims.

The invention claimed is:

1. A catamaran surface effect ship for traversing a water surface, comprising a catamaran surface effect hull having a hull baseline, spaced apart hulls connected with a deck having a deck underside, and an integral propulsion system for propelling the hull,
   a) the catamaran surface effect hull having forward and aft flexible seals that enable pressured air to be trapped in an air space that is positioned generally in between the hulls and in between the seals,
   b) wherein each hull has a smoothly curved bottom portion connecting to a pair of smooth side portions and absent chines, a propeller shaft, each shaft having a propeller and each shaft positioned above the hull baseline,
   c) wherein the catamaran hull is operable in two modes, a first low speed mode wherein the hull drops and the propellers are fully submerged and a second high speed mode wherein the hull elevates and the propellers are partially submerged surface piercing propellers; and
   d) wherein the high speed mode elevates each hull so that the water surface is at a position next to the smoothly curved bottom portion;
   e) in the low speed mode, the water surface is at a position that wets both smooth side portions of each hull, but is below the deck underside, the low speed mode defined by a Froude number of between about 0 and 0.4.

2. The apparatus of claim 1 further comprising a lift fan system that pumps air to the hull to operate as an air cushion vehicle and wherein the horsepower to the lift fan system is varied to select an intermediate water line that is in between a displacement and a high speed air cushion mode.

3. The apparatus of claim 1, wherein the propellers are surface piercing propellers, each aligned with a hull.

4. The apparatus of claim 1, further comprising forward mounted foil stabilizers for facilitating ride stabilization and load compensation, at high and low speeds.

5. The apparatus of claim 4, wherein the foil stabilizers generate transverse roll forces that improve high speed maneuvering.

6. The apparatus of claim 1, further comprising a superstructure on the hulls.

7. The apparatus of claim 1, wherein the side portions are generally vertically oriented.

8. The apparatus of claim 7 wherein the hulls do not generate dynamic lifting forces.

9. The apparatus of claim 1, wherein the hulls are non-lifting side hulls.

10. The apparatus of claim 1, wherein the side hulls are molded (rounded) forms featuring parabolic waterlines and semi-elliptical cross sections to minimize the characteristic wave trains associated with low speed.

11. The apparatus of claim 1, wherein small lifting surfaces provide load compensation, ride control and high-speed stabilization.

12. The apparatus of claim 11, wherein the small lifting surfaces comprise two independently controlled wing sections mounted port and starboard below the waterline, inboard and forward on the side hulls.

13. The apparatus of claim 1, further comprising retractable air cushion seals.

14. A catamaran surface effect ship for traveling upon a water surface, comprising:
   a) a catamaran surface effect hull having a hull baseline, spaced apart port and starboard hulls connected with a deck having a deck underside surface, and an integral propulsion system for propelling the hull,
   b) the catamaran surface effect hull having forward and aft flexible seals that enable pressured air to be trapped in an air space that is positioned generally under the deck underside surface and in between the port and starboard hulls and in between the seals,
   c) wherein each hull has a central longitudinal axis and a propeller shaft, each shaft having a propeller and each shaft aligned generally with said axis;
   d) wherein the catamaran hull is operable in two modes, a first low speed mode that is a displacement hull mode wherein the hull drops and the propellers are fully submerged and a second high speed mode wherein the hull elevates and the propellers are only partially submerged;
   e) wherein the high speed mode is an air cushion mode that elevates each hull so that the waterline is next to the smoothly curved bottom portion; and
   f) wherein in the low speed mode, the waterline is at a position that wets both smooth side portions of each hull, but is below the deck underside surface.

15. The apparatus of claim 14 wherein the low speed mode is defined by a Froude number of between about 0 and 0.4.

16. The apparatus of claim 14 further comprising a lift fan system that pumps air to the hull to operate as an air cushion vehicle and wherein the horsepower to the lift fan system is varied to select an intermediate water line that is in between a displacement and a high speed air cushion mode.

17. The apparatus of claim 14, wherein the propellers are surface piercing propellers, each aligned with a hull.

18. The apparatus of claim 17, wherein the foil stabilizers generate transverse roll forces that improve high speed maneuvering.

19. The apparatus of claim 14, further comprising forward mounted foil stabilizers for facilitating ride stabilization and load compensation, at high and low speeds.

20. The apparatus of claim 14, further comprising a superstructure on the hulls.

21. The apparatus of claim 14, wherein the hulls are non-lifting sidehulls.

22. The apparatus of claim 14, wherein the side hulls are molded (rounded) forms featuring parabolic waterlines and semi-elliptical cross sections to minimize the characteristic wave trains associated with low speed.

23. The apparatus of claim 14, wherein small lifting surfaces provide load compensation, ride control and high-speed stabilization.

* * * * *